March 2, 1948.  E. M. DONS ET AL  2,437,083
PIPE COUPLING
Filed Dec. 8, 1945  5 Sheets-Sheet 1
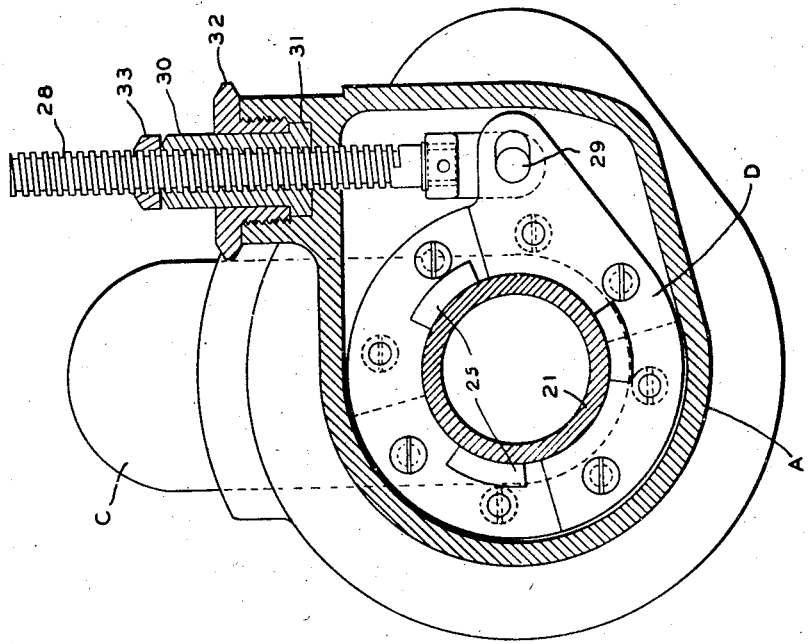
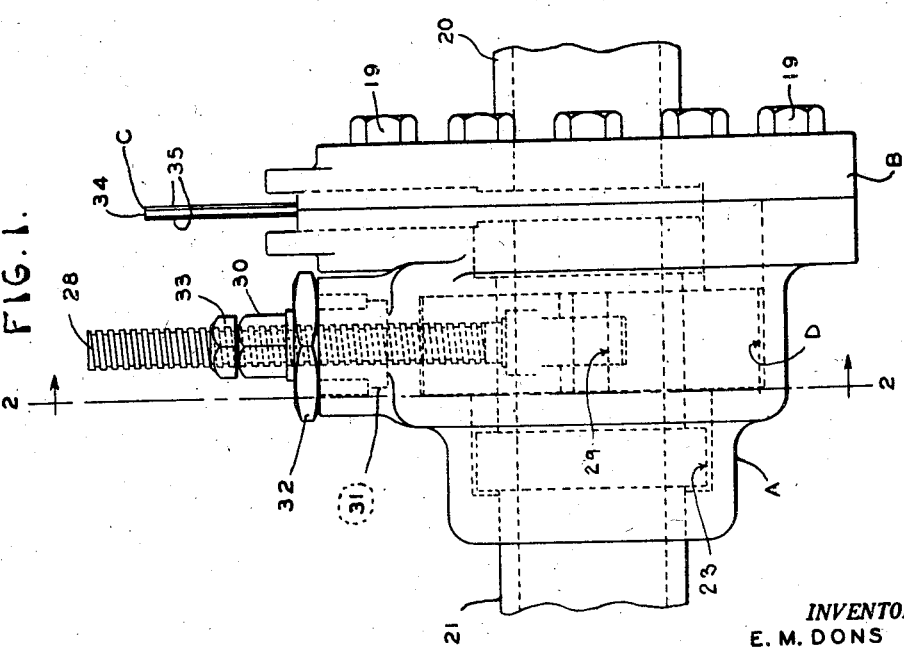
INVENTORS
E. M. DONS
J. V. STEVENS
BY McCauley & McCauley
ATTORNEYS.

INVENTORS.
E. M. DONS
J. V. STEVENS
BY McCauley & McCauley
ATTORNEYS.

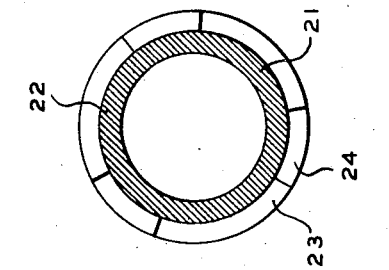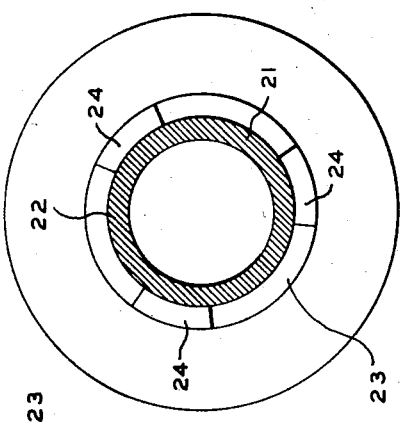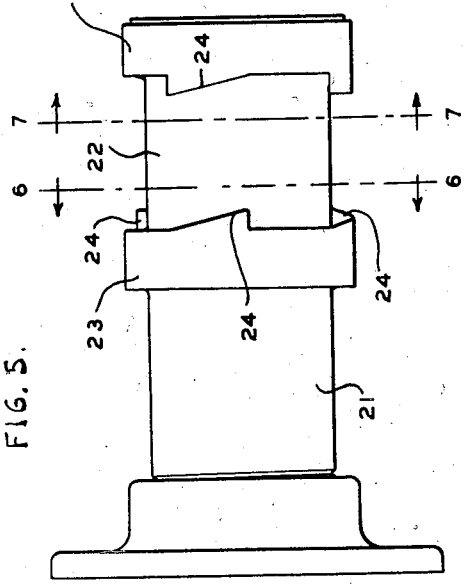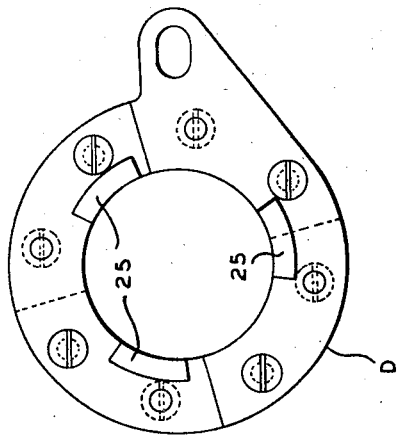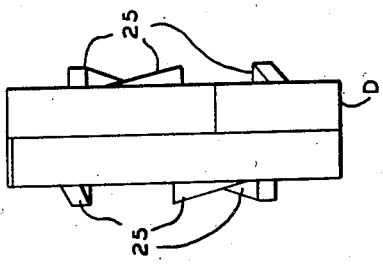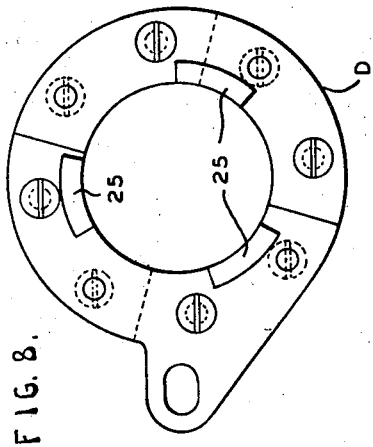

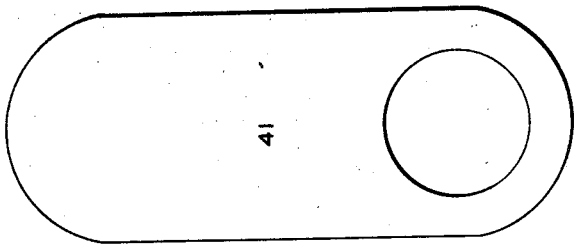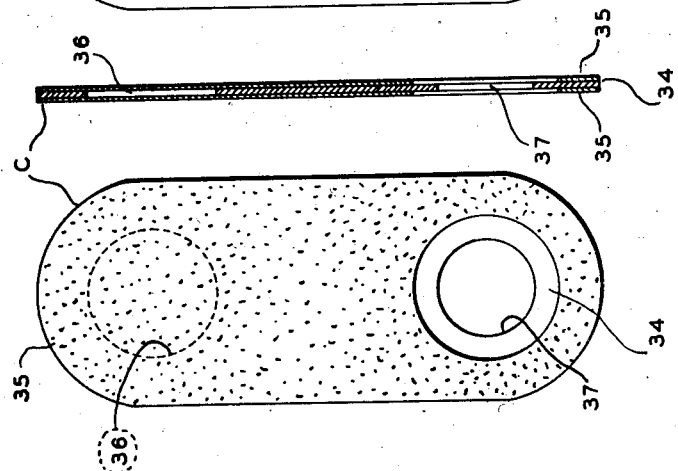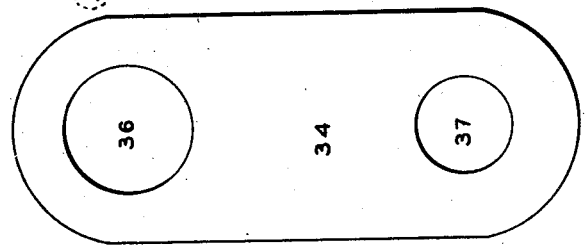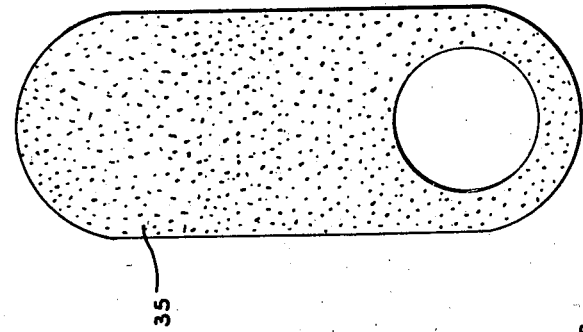

March 2, 1948.    E. M. DONS ET AL    2,437,083
PIPE COUPLING
Filed Dec. 8, 1945    5 Sheets-Sheet 5

*INVENTORS*
E. M. DONS
J. V. STEVENS
BY McCauley & McCauley
ATTORNEYS.

Patented Mar. 2, 1948

2,437,083

UNITED STATES PATENT OFFICE 2,437,083

PIPE COUPLING

Eddie M. Dons, Tulsa, and Jesse V. Stevens, Oakhurst, Okla.

Application December 8, 1945, Serial No. 633,756

7 Claims. (Cl. 138—45)

This invention relates to pipe couplings, one of the objects being to produce a coupling device whereby adjacent pipe sections can be easily and quickly forced toward and away from each other. More specifically stated, an object is to forcibly open and close a space between two pipe sections, without actually disconnecting the pipe sections, while providing for quick removal and replacement of articles desired between said pipe sections. For example, an old gasket may be quickly removed and replaced by a new gasket. However, this merely suggests the general concept.

A separate and distinct object is to conveniently arrange for variations in orifices between the connected pipe sections.

A further separate and distinct value of the invention appears in the rapid insertion of a "blind" closure member, so as to promptly close communication between two pipe sections.

With the foregoing and other objects in view, the invention comprises the specific combination and arrangement of details herein shown and described to illustrate features of the invention. However, it is to be understood that the scope of this invention extends to variations and modifications described by claims hereunto appended.

Fig. 1 is a side view of a pipe coupling embodying features of this invention.

Fig. 2 is a vertical section taken approximately on the line 2—2 in Fig. 1, with the operating nut appearing in section to more clearly show the means for preventing longitudinal displacement of said operating nut.

Fig. 5 is a side view of the slidable pipe section, including its integral flanges and cam members extending inwardly therefrom.

Fig. 6 is a section on the line 6—6 in Fig. 5.

Fig. 7 is a section on the line 7—7 in Fig. 5.

Fig. 8 is a detail view of the oscillatory operating ring, showing the segments and cams at one side of said ring.

Fig. 9 is an edge view of said operating ring.

Fig. 10 is a view of said ring showing the side face opposite to that shown in Fig. 8.

Fig. 11 illustrates a gasket suitable for use between the pipe sections.

Fig. 12 shows an orifice member having holes of different diameters.

Fig. 13 shows the gasket of Fig. 11 applied to said orifice member.

Fig. 14 is a vertical section showing gaskets at opposite sides of the orifice member.

Fig. 15 is a view similar to Fig. 12, illustrating another form of this detail.

Figure 3:
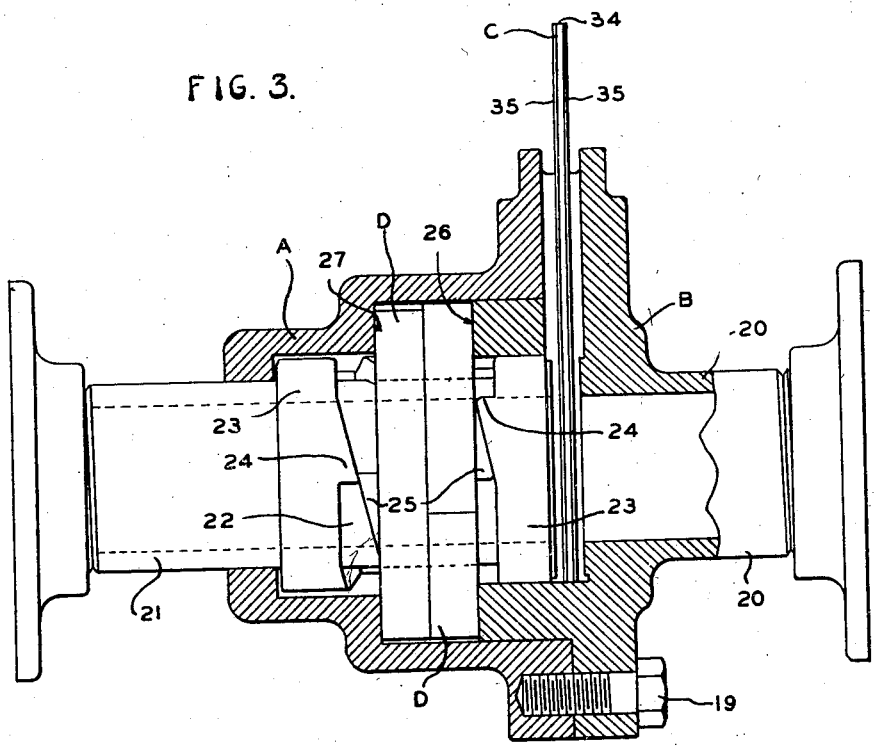
Fig. 3 is a longitudinal section of the housing, with the operating cams and portions of the pipe sections in elevation, showing the device as it appears when the pipe sections are separated from each other.

The housing herein shown comprises an elongated housing member A, and a shorter closure member B united by means of screws 19, as shown in Figures 1 and 3. These members A and B have flanges to receive the connecting screws 19.

To illustrate suitable pipe sections extending from the housing we have shown a pipe section 20 formed integral with the housing member B, and a pipe section 21 slidable in the housing member A.

A removable sealing device C is interposed between these pipe sections 20 and 21, so as to seal the pipe coupling when the slidable pipe section 21 is forced toward its companion pipe section 20. Assuming that the sealing device C includes a gasket of any suitable type, it may be noted that the coupling will be sealed when the slidable pipe section 21 is shifted from the position shown in Fig. 3 to the closed position shown in Fig. 4.

The means for detachably clamping said gasket, or sealing device, between the pipe sections comprises an oscillatory operating ring D surrounding a neck 22 of the slidable pipe section 21. This slidable pipe section 21 is provided with separated flanges 23 having cam members 24 at opposite sides of said oscillatory operating ring D.

Furthermore, cam members 25 are carried by opposite sides of said oscillatory ring, and these cam members 25 cooperate with the cam members 24 to positively shift the slidable pipe section 21 toward and away from its companion pipe section 20, thereby clamping and releasing the sealing device C.

Figure 4:
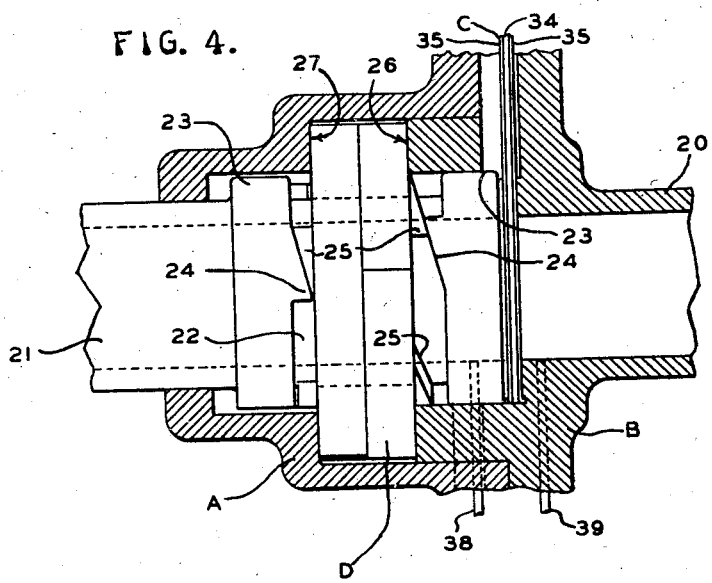
Fig. 4 is a fragmentary view, similar to Fig. 3, showing the clamping condition which appears when the pipe sections are forced toward each other.

The housing is provided with internal abutments 26 and 27, as shown in Figures 3 and 4, and the oscillatory operating ring is confined between said abutments, so as to prevent or limit lateral displacement of said ring with relation to the housing. Consequently, the oscillatory movements of said ring will positively reciprocate the pipe section 21 toward and away from the pipe section 20. Or, such oscillatory movements may accomplish the same result by shifting the housing and its pipe section 20 toward and away from the pipe section 21. The double-acting cams 24 and 25 insure the desired forcible movements in both directions.

The separated flanges 23 may be integrally united with the pipe section 21, as shown most clearly in Fig. 6. However, the oscillatory operating ring can be made of separate segments (Figures 8, 9 and 10) to be assembled and united around the neck 22, so as to provide for location of the ring between said flanges 23, while locating the cams 25 on the outer side faces of the assembled segments. Figures 8, 9 and 10 clearly show a suitable ring wherein two pairs of semi-circular segments are united by means of screws to form the circular ring with cams 25 at its opposite sides.

However, the oscillatory ring may be formed in any suitable manner, and any desired means may be employed to oscillate said ring. We are inclined to prefer a driving member extending from and connected to said ring under conditions which forcibly drive said ring in both directions.

For example, in Fig. 2 there is a screw threaded driving member 28 connected as shown at 29 to an extension of said oscillatory ring, an operating nut 30 rotatable on the screw thread of said driving member to oscillate said ring, said operating nut being exposed at the exterior of the housing, and means for preventing displacement of said nut 30 in a direction longitudinally of said screw threaded driving member 28. In this form, the rotatable nut 30 has a flange 31 at the bottom confined by a bushing 32 screwed into the housing, and after the desired adjustment has been made, the nut 30 is anchored by a jam nut 33.

Special advantages are gained when this device is associated with an orifice meter. For example, the detachable sealing device C may include an elongated orifice member 34 with gaskets 35 at opposite sides of said orifice member, as shown most clearly in Figures 12, 13 and 14. This elongated orifice member 34 has upper and lower orifices 36 and 37 of different diameters, and it can be readily removed and replaced in an inverted condition to selectively change the area of the orifice between the pipe sections, thereby varying the flow through the orifice member.

Figure 16:
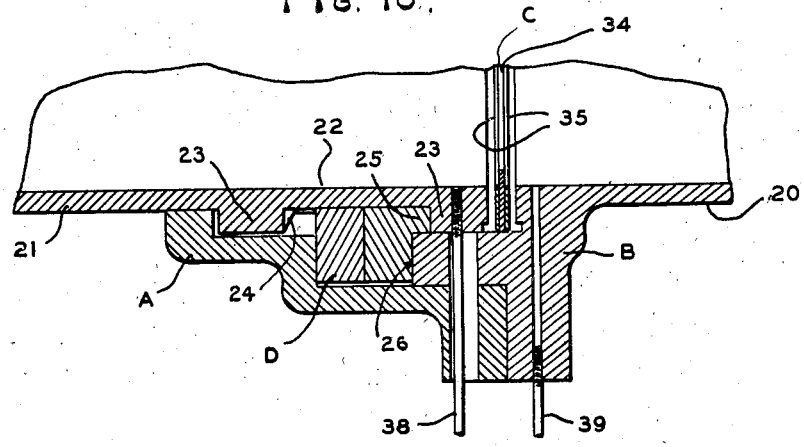
Fig. 16 is a fragmentary longitudinal section showing an arrangement of by-pass pipes at opposite sides of the orifice member.
Figure 17:
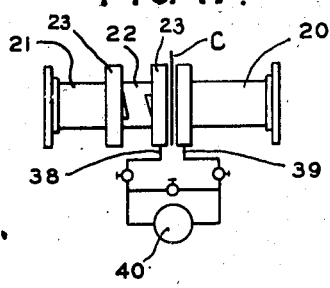
Fig. 17 is a diagram of a condition which appears when said by-pass pipes are connected to an orifice meter.
Figure 18:
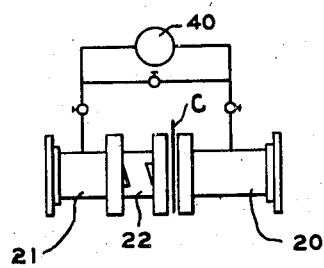
Fig. 18 is a diagram of another form wherein the by-pass pipes are more widely separated from each other.

Fig. 4 and Fig. 16 show pipes 38 and 39 extending from the pipe sections at opposite sides of the orifice member 34, and these pipes may be connected to a meter 40 as shown by the diagram in Fig. 17. Or, the meter 40 could be connected to widely separated portions of the pipe sections 20 and 21 as suggested by the diagram in Fig. 18.

From another viewpoint, the convenient opening and closing of a pipe coupling as herein set forth is desirable in operations which require a rapid change from a fully open connection to a "blind" closure which positively prevents the transmission of fluid from one pipe section to another. An illustration of this point appears in Fig. 15 wherein an elongated closure member 41 has an opening at its lower portion to provide for free flow through the pipe sections, and an upper portion to close communication between the pipe sections when the member 41 is inverted.

We claim:

1. A pipe coupling comprising a housing, pipe sections extending from said housing, a gasket between said pipe sections, and means for detachably clamping the gasket between said pipe sections, said clamping means comprising an oscillatory operating ring surrounding one of said pipe sections, the last mentioned pipe section being provided with cam members at opposite sides of said oscillatory operating ring, cam members carried by said opposite sides of the oscillatory ring cooperating with the first mentioned cam members to clamp and release the gasket, said oscillatory operating ring being confined in said housing at one side of said gasket so as to limit lateral displacement of said ring with relation to the housing, and a driving member extending from said operating ring, said driving member being movable in opposite directions to provide for said clamping and release of the gasket.

2. A pipe coupling comprising a housing, pipe sections extending from said housing, one of said pipe sections being slidable in the housing, a gasket between said pipe sections, and means for detachably clamping the gasket between said pipe sections, said clamping means comprising an oscillatory operating ring surrounding the slidable pipe section, said slidable pipe section being provided with separated flanges having cam members at opposite sides of said oscillatory operating ring, cam members carried by said opposite sides of the oscillatory ring cooperating with the first mentioned cam members to clamp and release the gasket, said housing being provided with internal abutments, said oscillatory operating ring being located at one side of said gasket and confined between said abutments so as to limit lateral displacement of said ring with relation to the housing, and a driving member extending from said operating ring, said driving member being movable in opposite directions to oscillate the operating ring and thereby provide for said clamping and release of the gasket.

3. A pipe coupling comprising a housing, pipe sections extending from said housing, one of said pipe sections being slidable in the housing, a gasket between said pipe sections, and means for detachably clamping the gasket between said pipe sections, said clamping means comprising an oscillatory operating ring surrounding the slidable pipe section, said slidable pipe section being provided with separated flanges having cam members at opposite sides of said oscillatory operating ring, cam members carried by said opposite sides of the oscillatory ring cooperating with the first mentioned cam members to clamp and release the gasket, said housing being provided with internal abutments, said oscillatory operating ring being located at one side of said gasket and confined between said abutments so as to limit lateral displacement of said ring with relation to the housing, and a driving member extending from said operating ring, said driving member being movable in opposite directions to oscillate the operating ring and thereby provide for said clamping and release of the gasket, the operating ring being made of separate segments assembled between said flanges so as to provide for location of the ring between the flanges, and the cams of said oscillatory ring being on outer side faces of the assembled segments.

4. A pipe coupling comprising a housing, pipe sections extending from said housing, one of said pipe sections being slidable in the housing, and a double-acting cam device to positively force said slidable pipe section toward and away from its companion pipe section, said cam device comprising an oscillatory operating ring surrounding the slidable pipe section, said slidable pipe section being provided with cam members at opposite sides of said oscillatory operating ring, cam members carried by said opposite sides of the oscillatory ring cooperating with the first mentioned cam members to positively shift the slidable pipe section in opposite directions, said oscillatory operating ring being confined in said housing so as to limit lateral displacement of said ring with relation to the housing, and a driving member connected to said operating ring, said driving member being movable in opposite directions to forcibly oscillate said ring between the cam members of said slidable pipe section.

5. A pipe coupling comprising a housing, pipe sections extending from said housing, a gasket between said pipe sections, and means for detachably clamping the gasket between said pipe sections, said clamping means comprising an oscillatory operating ring surrounding one of said pipe sections, the last mentioned pipe section being provided with cam members at opposite sides of said oscillatory operating ring, cam members carried by said opposite sides of the oscillatory ring cooperating with the first mentioned cam members to clamp and release the gasket, said oscillatory operating ring being located at one side of said gasket and confined in said housing so as to limit lateral displacement of said ring with relation to the housing, a screw threaded driving member connected to said oscillatory operating ring, an operating nut rotatable on the screw thread of said driving member to oscillate said operating ring, said operating nut being exposed at the exterior of the housing, and means for preventing displacement of said nut in a direction longitudinally of said screw threaded driving member.

6. A pipe coupling comprising a housing, pipe sections extending from said housing, an orifice member located between said pipe sections and having an orifice arranged for a flow of fluid from one pipe section to the other, said orifice member having an extended portion provided with a different orifice to vary the flow through the orifice member, said orifice member being movable to selectively locate either of its orifices between the pipe sections, and means for detachably clamping the orifice member between the pipe sections, said clamping means comprising an oscillatory operating ring located at one side of said orifice member and surrounding one of said pipe sections, the last mentioned pipe section being provided with cam members facing said oscillatory ring, cam members carried by the oscillatory operating ring contacting with the first mentioned cam members to clamp and release the orifice member, said oscillatory ring being confined in said housing to provide for forcible displacement at the cooperating cam members, and a driving member connected to said oscillatory operating ring, said driving member being movable in opposite directions to clamp and release said orifice member.

7. A pipe coupling comprising a housing, pipe sections extending from said housing, an orifice member located between said pipe sections and having an orifice arranged for a flow of fluid from one pipe section to the other, said orifice member having an extended portion provided with a different orifice to vary the flow through the orifice member, said orifice member being movable to selectively locate either of its orifices between the pipe sections, and means for detachably clamping the orifice member between the pipe sections, said clamping means comprising an oscillatory operating ring located at one side of said orifice member and surrounding one of said pipe sections, the last mentioned pipe section being provided with cam members facing said oscillatory ring, cam members carried by the oscillatory operating ring contacting with the first mentioned cam members to clamp and release the orifice member, said oscillatory ring being confined in said housing to provide for forcible displacement at the cooperating cam members, and a driving member connected to said oscillatory operating ring, said driving member being movable in opposite directions to clamp and release said orifice member, said pipe sections being provided with extended tubular connections leading from opposite sides of said orifice member, and a meter interposed between said extended tubular connections.

EDDIE M. DONS.
JESSE V. STEVENS.

REFERENCES CITED

The following references are of record in the file of this patent:

UNITED STATES PATENTS

| Number | Name | Date |
| --- | --- | --- |
| 905,244 | Stewart | Dec. 1, 1908 |
| 1,096,052 | Plank | May 12, 1914 |
| 2,242,467 | Hamer | May 20, 1941 |
| 2,278,848 | Hamer | Apr. 7, 1942 |